United States Patent
Hofmann et al.

(10) Patent No.: US 9,853,534 B2
(45) Date of Patent: Dec. 26, 2017

(54) CONVERTER CIRCUIT ARRANGEMENT AND CONVERSION METHOD

(71) Applicant: Infineon Technologies Austria AG, Villach (AT)

(72) Inventors: Andreas Hofmann, Oberhaching (DE); Pierrick Ausseresse, Munich (DE)

(73) Assignee: Infineon Technologies Austria AG, Villach (AT)

(*) Notice: Subject to any disclaimer, the term of this patent is extended or adjusted under 35 U.S.C. 154(b) by 462 days.

(21) Appl. No.: 14/042,761

(22) Filed: Oct. 1, 2013

(65) Prior Publication Data
US 2015/0091452 A1  Apr. 2, 2015

(51) Int. Cl.
H05B 33/08 (2006.01)
H02M 1/00 (2006.01)
H05B 37/02 (2006.01)

(52) U.S. Cl.
CPC .......... *H02M 1/00* (2013.01); *H05B 33/0815* (2013.01); *H05B 37/02* (2013.01); *Y02B 20/346* (2013.01); *Y10T 307/549* (2015.04)

(58) Field of Classification Search
CPC ............... H05B 33/08; H05B 33/0815; H05B 33/0809; H05B 33/0824; H05B 37/02; H02M 1/00; H02M 2001/0003; H02M 2001/0045; Y02B 20/346; Y10T 307/549
USPC ........ 315/161, 200 R, 209 R, 224, 246, 247, 315/291, 307, 308; 363/17, 21.01, 21.12, 363/56.02, 98, 123, 126
See application file for complete search history.

(56) References Cited

U.S. PATENT DOCUMENTS

| 5,818,214 A | 10/1998 | Pelly et al. |
| 7,095,639 B2 * | 8/2006 | Cho .................. H02M 1/08 363/131 |
| 2002/0024827 A1 * | 2/2002 | Dubhashi ............. H02M 3/156 363/21.01 |
| 2005/0024898 A1 * | 2/2005 | Yang ................. H02M 3/33507 363/21.12 |
| 2006/0033556 A1 | 2/2006 | Grasso et al. |
| 2008/0012507 A1 | 1/2008 | Nalbant |

(Continued)

FOREIGN PATENT DOCUMENTS

| CN | 102263492 A | 11/2011 |
| CN | 202309520 U | 7/2012 |

(Continued)

OTHER PUBLICATIONS

LM3407 350 mA, "Constant Current Output Floating Buck Switching Converter for High Power LEDs"; National Semiconductor; Literature No. SNVS553A, Jan. 21, 2009, pp. 1-18.

(Continued)

*Primary Examiner* — Thai Pham
(74) *Attorney, Agent, or Firm* — Shumaker & Sieffert, P.A.

(57) ABSTRACT

A converter circuit arrangement is provided, including a converter switch controller, a converter switch, a load circuit interface and an inductor. The converter switch controller may include a control input. The converter switch may be coupled between a first power supply potential and the control input. The inductor may be coupled between a second power supply potential and the load circuit interface. The load circuit interface may be coupled between the control input and the inductor.

20 Claims, 3 Drawing Sheets

(56) References Cited

U.S. PATENT DOCUMENTS

| | | | |
|---|---|---|---|
| 2008/0018267 A1* | 1/2008 | Arakawa | H05B 33/0815 315/301 |
| 2008/0074058 A1* | 3/2008 | Lee | H05B 33/0815 315/291 |
| 2009/0267534 A1 | 10/2009 | Godbole et al. | |
| 2010/0102793 A1 | 4/2010 | Dishman et al. | |
| 2011/0026277 A1 | 2/2011 | Strijker | |
| 2011/0292704 A1* | 12/2011 | Makino | H02M 1/4208 363/126 |
| 2012/0098430 A1* | 4/2012 | Inoue | H05B 33/0893 315/82 |

FOREIGN PATENT DOCUMENTS

| | | | |
|---|---|---|---|
| DE | 10059644 | A1 | 6/2002 |
| DE | 60117630 | T2 | 12/2006 |
| EP | 1148627 | B1 | 3/2006 |

OTHER PUBLICATIONS

Tony Huang, "Floating Buck-Boost LED Driver Control-Loop Analysis"; Application Report SLVA312; Texas Instruments, Dec. 2008, pp. 1-13.

* cited by examiner

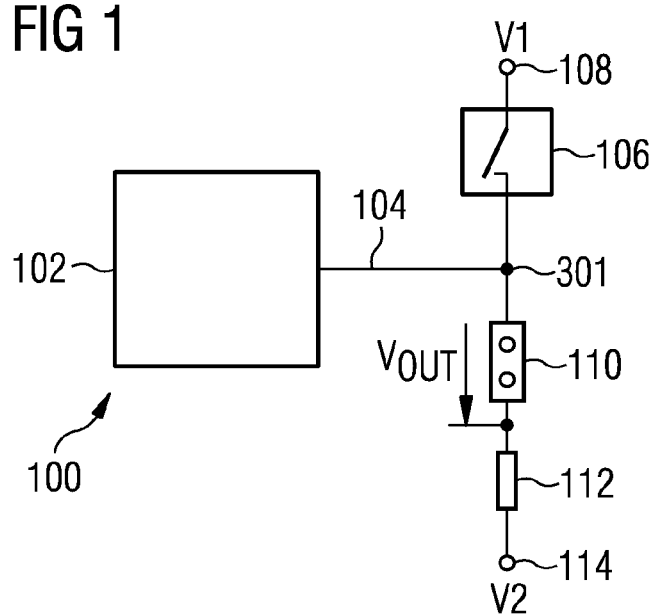
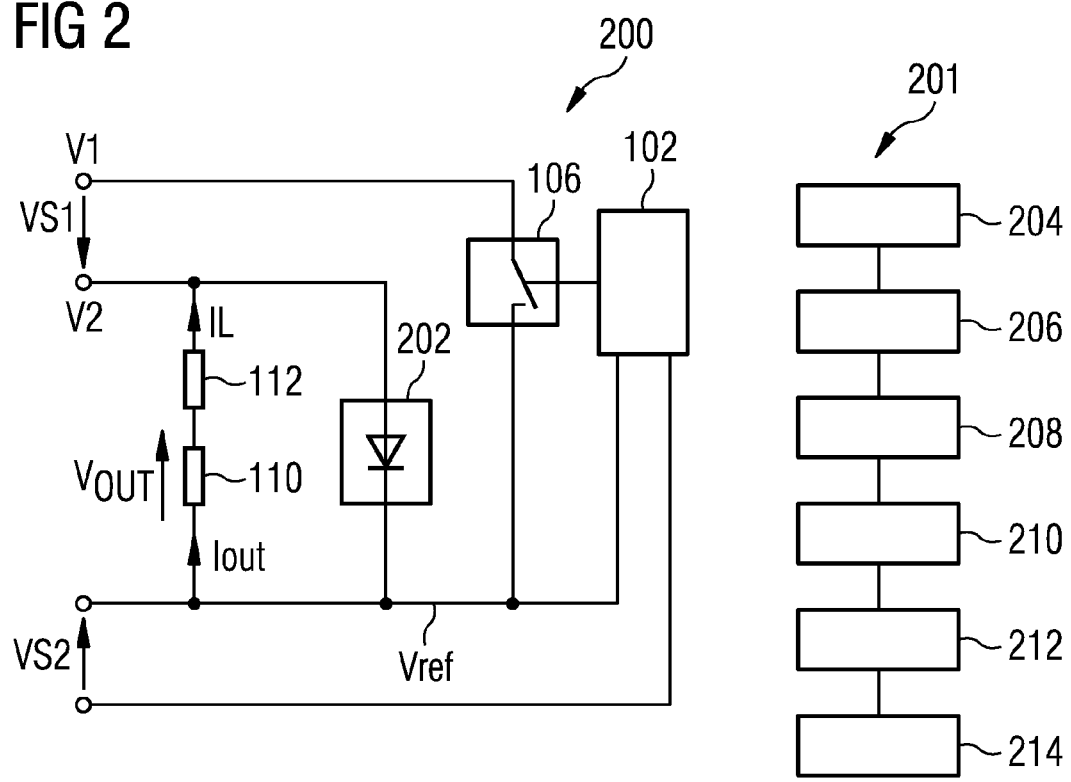

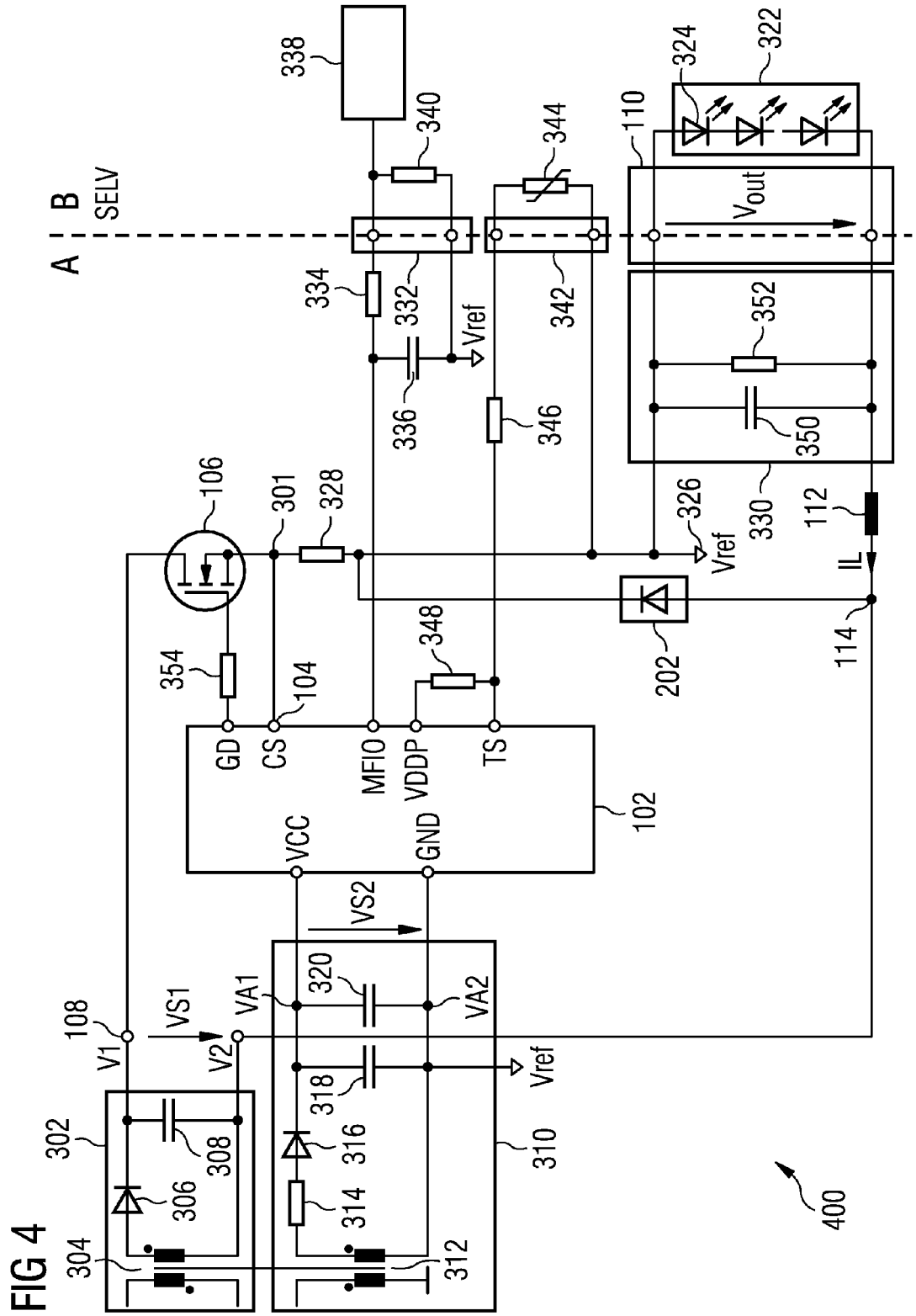

CONVERTER CIRCUIT ARRANGEMENT AND CONVERSION METHOD

TECHNICAL FIELD

Various embodiments relate generally to converter circuit arrangements and to conversion methods.

BACKGROUND

Converters may be used to transform voltages. For example, a buck converter may be used to transform a direct current (DC) input voltage into another direct current (DC) output voltage. The output voltage may be smaller than the input voltage. The average value of the output voltage may be adjusted by setting periodic opening and closing times of a switch. When the switch is closed, a current builds up in an inductor and current flows through a load. When the switch is opened, a freewheeling device allows the current in the inductor to continue to flow and the load is supplied with energy stored in the inductor.

Protection against electric shock may be achieved by using Extra Low Voltages (ELV) or Safety Extra Low Voltage (SELV) in electrical circuits. Protective separation, for example in the form of double isolation, reinforced isolation or protective screening, may also be used for this purpose. If the electric potential of any conductor, including those of control signals, against ground is not larger than 25 V RMS (35 volts peak) for alternating current or 60 V for direct current and the leakage current is not larger than 2 mA DC, protective separation may not be needed.

A N-channel MOSFET may be used without complex driving as a low side switch in a buck converter. In this case, the load is usually connected to the positive potential of the input voltage while any communication interfaces (for example temperature sensing) remain at MOSFET source potential. Therefore, if the converter output is to fulfill SELV requirements without protective separation, the maximum allowable input voltage is limited to the maximum SELV voltage (60 V max). The converter output voltage available to the load will then typically be about 5 to 50 V.

The converter output voltage limitations can be overcame by using a high side switch. However, driving a high side switch is more complicated and will lead to higher costs for components.

It is desirable to provide a low-cost, SELV compliant converter with an output voltage of up to 60 V.

SUMMARY

A converter circuit arrangement is provided, including a converter switch controller, a converter switch, a load circuit interface and a current storing device, such as an inductor. The converter switch controller may include a control input. The converter switch may be coupled between a first power supply potential and the control input. The inductor may be coupled between a second power supply potential and the load circuit interface. The load circuit interface may be coupled between the control input and the inductor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows an embodiment of a converter circuit arrangement;

FIG. 2 shows an embodiment of a converter circuit arrangement and a method;

FIG. 4 shows a modified embodiment of a converter circuit arrangement.

DESCRIPTION

Figure 3:
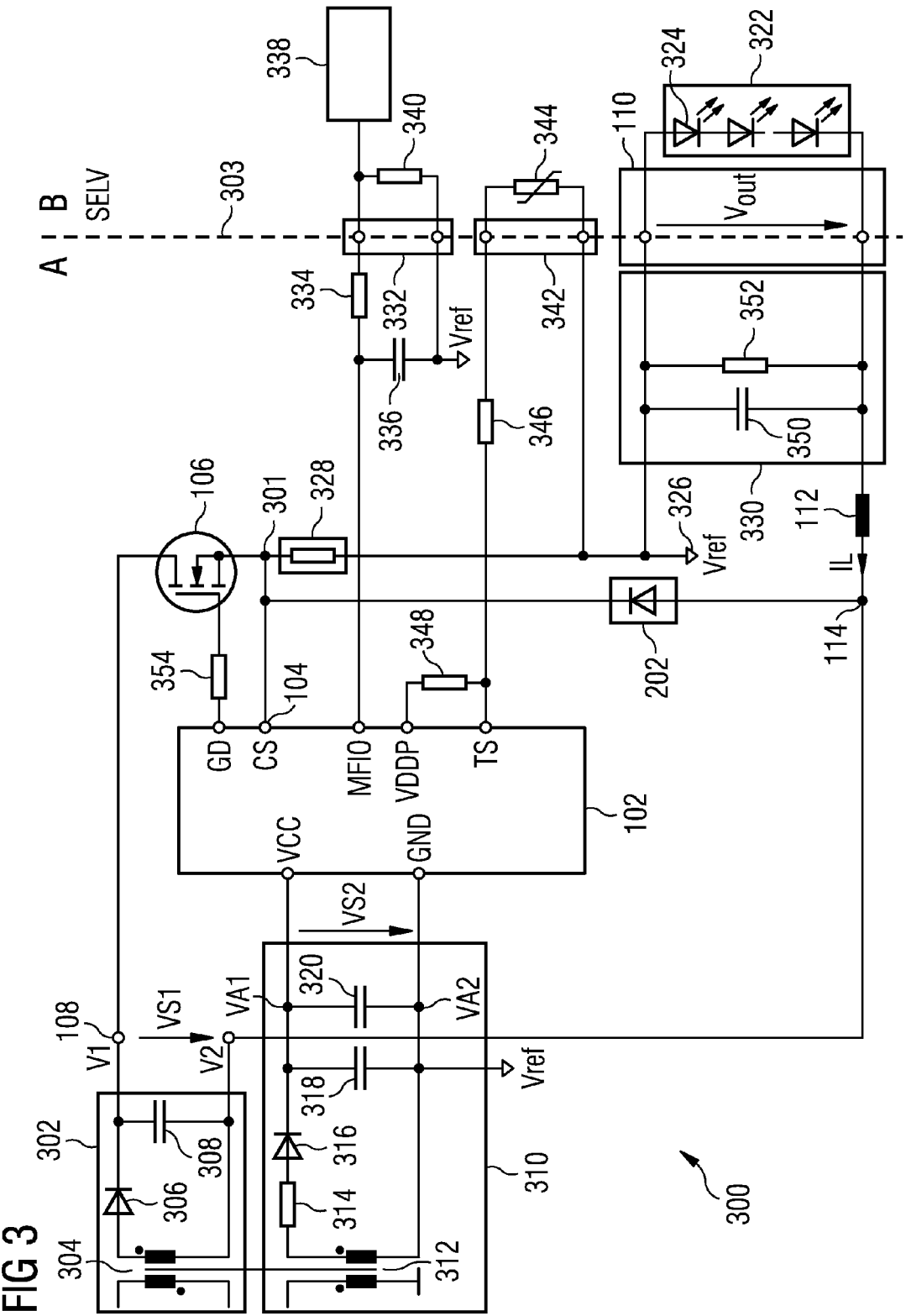
FIG. 3 shows an embodiment of a converter circuit arrangement.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

FIG. 1 shows an embodiment of a converter circuit arrangement 100. The converter circuit arrangement 100 may include a converter switch controller 102, a converter switch 106, a load circuit interface 110 and an inductor 112.

The converter switch controller 102 may comprises a programmable controller, for example a digitally programmable controller. The converter switch controller 102 may include a control input 104.

The converter switch 106 may be coupled between a first power supply potential V1 at a node 108 and the control input 104. The converter switch 106 may include one or more transistor switches. The transistor switch 106 may include a power transistor switch. The transistor switch 106 may include a field effect transistor switch or a bipolar transistor switch or an insulated gate bipolar transistor switch. The transistor switch 106 may include a metal oxide semiconductor field effect transistor switch. The metal oxide semiconductor field effect transistor switch may include an n-channel metal oxide semiconductor field effect transistor switch.

The inductor 112 may be coupled between a second power supply potential V2 at a node 114 and the load circuit interface 110. The load circuit interface 110 may be coupled between the control input 104 and the inductor 112.

The load circuit interface 110 may be used to couple a load circuit to the converter circuit arrangement. The load circuit may require a voltage that is less than the voltage between the first power supply potential V1 and second power supply potential V2. The load circuit may be any device, for example a light emitting device.

FIG. 2 shows an embodiment of a converter circuit arrangement 200, for example a buck converter, and a method 201, for example for converting a first voltage VS1 into a second voltage Vout and current Iout, respectively. The second voltage Vout may be less than the first voltage VS1 and may be used for driving a load circuit. Both the first voltage VS1 and the second voltage Vout may be direct current (DC) voltages with respective direct currents. The second voltage Vout may be a SELV-voltage and may be provided at a load circuit interface 110.

The converter circuit arrangement 200 may be the same as or similar to the converter circuit arrangement 100 shown in FIG. 1, so that the corresponding description may also apply here.

At 204, a first supply voltage VS1 may be provided, which may be the first voltage. The first supply voltage VS1 may be floating with respect to a reference potential Vref. In other words, the first supply voltage VS1 does not have a fixed relationship to the reference potential Vref. In still other words, a first potential V1 of the first supply voltage VS1 and a second potential V2 of the first supply voltage VS1 both do not have a constant voltage difference to the reference potential Vref. The reference potential Vref may for example be a ground potential.

At 206, a second supply voltage VS2 may be provided. The second supply voltage VS2 may be referenced to the reference potential Vref. In other words, the second supply voltage VS2 may have a fixed relationship to the reference potential Vref. In still other words, at least one of the potentials of the second supply voltage VS2 may have a constant voltage difference to the reference potential Vref. For example, one of the potentials of the second supply voltage VS2 may be at the same potential as the reference potential Vref. The second supply voltage VS2 may be used to power a converter switch controller 102, shortly called a controller.

At 208, a converter switch 106, shortly called a switch, may be provided and coupled between the first potential V1 of the first supply voltage VS1 and the reference potential Vref.

At 210, an inductor 112 may be provided and coupled between the second potential V2 of the first supply voltage VS1 and, via a load circuit connected to a load circuit interface 110, the reference potential Vref.

At 212, switch 106 may be controlled to allow a current IL to flow through the inductor 112 and the load circuit. The switch 106 may be controlled by a controller 102. The controller 102 may be powered by the second supply voltage VS2.

At 214, the switch 106 may be open and the current IL flowing in the inductor 112 may be freewheeled. In other words, a path for the current IL flowing in the inductor 112 other than through the switch 106 may be provided. For example, the freewheeling path may be provided by a diode 202 which is connected in a reverse direction—and thus non-conducting—when the switch 106 is closed and connected in a forward direction—and thus conducting—when the switch 106 is open. For example, an anode of the diode 202 may be connected to the second potential V2 of the first supply voltage VS1 and a cathode may be connected to the reference potential Vref. In this way, the current IL through the inductor may continue to flow even when the switch 106 is open.

Instead of a diode 202, a controlled transistor may be used as a freewheeling device. The transistor may be controlled to conduct current when the switch 106 is open and may be controlled to block current when the switch 106 is closed. It may be operated in a synchronized manner, for example in anti-phase, with switch 106.

The controller 102 may adjust a current through the inductor 112 and/or the load circuit connected to the load circuit interface 110 depending on a measured current and a target current. The measured current may be a current through the load circuit connected to the load circuit interface 110 or through the inductor 112. If the measured current falls below a target current, the controller may close the switch 106 for a longer time per period than before. If the measured current rises above a target current, the controller may open the switch 106 for a longer time per period than before.

The controller may be powered by the second supply voltage VS2 which is referenced to the reference potential Vref. All the control signals for operating the controller, such as for example VCC, GND, CS, MFIO, VDDP, TS described in conjunction with FIG. 3 and FIG. 4, may be positive with respect to the reference potential Vref. The load circuit may be connected to the reference potential Vref and via the inductor 112 to the second potential V2 of the first supply voltage VS1. Because of the floating first supply voltage VS1, the second potential V2 may be negative with respect to the reference potential Vref and the first potential V1 may be positive with respect to the reference potential Vref. The converters input voltage VS1 may be decoupled from the converters output voltage Vout.

The first supply voltage VS1 may therefore be chosen to be larger than a SELV-voltage, for example, it may be chosen larger than 60 V DC, for example, it may be 70 DC. It may be chosen large enough that the voltage Vout at the load circuit interface 110 is the maximum allowable SELV-voltage, for example 60 V DC. In this way, any voltage drops across the switch 106 and the inductor 112 are compensated for and the maximum SELV-voltage is available at the load circuit interface 110.

Further, a simple N-channel transistor without complicated driving, that is without requiring a shift to a different voltage level, for example using a charge pump, may be used as a switch 106. Its source may be coupled to the reference potential Vref, its drain may be coupled to the second potential V2 of the first supply voltage VS1 and its gate controlled may be controlled by a control signal of the controller in the range of the second supply voltage.

FIG. 3 shows an embodiment of a converter circuit arrangement 300. The converter circuit arrangement 300 may be the same as or similar to the embodiments of the converter circuit arrangement 100 and 200 shown in FIG. 1 and FIG. 2, respectively, so that their corresponding descriptions may also apply here.

The converter circuit arrangement 300 shown in FIG. 3 may be divided by a dotted line 303. Dotted line 303 may present an interface with a first side A and a second side B. All the voltages and currents of the converter circuit arrangement 300 accessible from the second side B may meet the SELV standard. They may be considered safe to be touched. The converter circuit arrangement 300 may therefore not need extensive safety testing or creepage and clearance evaluations. In contrast to the second side B, the first side A may have mains voltages. However, the first side A may be safe to be touched due to isolation of non-SELV voltages and currents.

In various embodiments, the converter circuit arrangement 300 may include a first power supply 302, an auxiliary power supply 310, a converter switch controller 102, a converter switch 106, a freewheeling device 202, an inductor 112, a current sensing structure 328, a configuration interface 332, a temperature interface 342, a damping circuit 330, a load circuit interface 110 and a load circuit 322.

In various embodiments, the first power supply 302 may be configured to provide the first power supply potential V1 and the second power supply potential V2. The first supply voltage VS1 may be defined as the difference between the first power supply potential V1 and the second power supply potential V2. The first power supply 302 may include a transformer 304, a diode 306 or a controlled transistor switch and a capacitor 308. A primary side of the transformer 304 may be connected to a mains voltage or line voltage, for example with a voltage of 110 V or 230 V. A voltage on a secondary side of the transformer 304 may be rectified by diode 306 or a full wave rectifier or a controlled transistor switch. The rectified voltage may be smoothed by the capacitor 308 to provide a DC voltage, here the first supply voltage VS1. The ratio of the number of windings on the primary side to the number of windings on the secondary side may be chosen so that the first supply voltage VS1 is at least as high as the voltage required for operating a load circuit 322. It may be chosen to be higher, for example to compensate for voltage drops across the converter switch 106 and the inductor 112. As an example, if the voltages at the load circuit interface 110 are to be close to the maximum allowable SELV, that is 60 V DC, the first supply voltage VS1 may be chosen to be around 70 V DC. In various embodiments, neither the first power supply potential V1 and the second power supply potential V2 is connected to a reference potential Vref, for example a ground potential. Both the first power supply potential V1 and the second power supply potential V2 may be floating with respect to the reference potential Vref.

In various embodiments, the auxiliary power supply 310 may be configured to provide the first auxiliary power supply potential VA1 and the second auxiliary power supply potential VA2. The second supply voltage VS2 may be defined as the difference between the first auxiliary power supply potential VA1 and the second auxiliary power supply potential VA2. The auxiliary power supply 310 may include a transformer 312, a resistance 314, a diode 316, a first capacitor 318 and a second capacitor 320. A primary side of the transformer 312 may be connected to a mains voltage or line voltage, for example with a voltage of 110 V or 230 V. A voltage on a secondary side of the transformer 312 may be rectified by diode 316 or a full wave rectifier. The resistor 314 may be connected in series with diode 314 and may be used to limit the current flow. The rectified voltage may be smoothed by the first capacitor 318 to provide a DC voltage, here the second supply voltage VS2. The second capacitor 320 may be used to short high frequency components in the second supply voltage VS2. The ratio of the number of windings on the primary side to the number of windings on the secondary side may be chosen so that the second supply voltage VS2 is high enough to operate the converter switch controller 102. The second power supply voltage VS2 may for example be 10 to 20 V.

The transformers 304, 312 may need to be isolating transformer with a guaranteed minimum distance between conductors and electrical isolation bathers if they are used in the generation of SELV voltages. They may share a common ferrite core, for example to save cost and space. In this case, the lower left coil of transformer 310 may be superfluous. However, the transformers 304, 312 are not necessary; any two power supplies may be used to provide the first power supply voltage VS1 and the second power supply voltage VS2, as long as they don't have a common reference potential.

In various embodiments, one of the first auxiliary supply potential VA1 and the second auxiliary supply potential VA2 may be connected to a reference potential Vref, for example to the ground potential GND. For example, the second auxiliary supply potential VA2 may be connected to a reference potential Vref.

In various embodiments, the converter switch controller 102 may be configured to receive the first auxiliary power supply potential VA1 at a terminal VCC, the second auxiliary power supply potential VA2 at a terminal GND, a current sense signal at a control input 104 on terminal CS, configuration information at a multifunction input/output terminal MFIO and temperature information at a tempera-ture sensor terminal TS. Terminal TS may be biased via a resistor 348 by a reference voltage provided at terminal VDDP. The reference voltage may for example be 3.3 V. The converter switch controller 102 may be configured to output a gate drive signal at terminal GD which may be used for controlling the converter switch 106. The gate drive signal may take into account temperature information at the temperature sensor terminal TS. The current flowing into a control terminal of the converter switch 106 may be limited by a resistor 354 coupled between terminal GD and the control terminal. The resistor 354 may be optional.

In various embodiments, the control input 104 may be coupled to a controller reference potential node 301. The controller reference potential node 301 may be coupled to a controller reference potential Vref. The controller reference potential Vref may be the ground potential GND.

In various embodiments, the converter circuit arrangement 300 may include a diode 202 or a synchronized transistor, which may be configured to provide a freewheeling path for the current IL flowing through the inductor 112 and the current flowing in the load circuit 322 when the converter switch 106 is open. The diode 202 or the synchronized transistor may be coupled between the second power supply potential V2 at node 114 and a controlled terminal of the converter switch 106 that is not coupled to the first power supply potential V1.

In various embodiments, the converter circuit arrangement 300 may include a current sensing structure 328. The current sensing structure 328 may be configured to provide an input to the control input 104 of the converter switch controller 102 during an on-period and off-period of the controller switch 106. The current sensing structure 328 may comprise a resistor connected between the control input 104 of the converter switch controller 102 and the load circuit interface 110. In various embodiments, the current sensing structure 328 may comprise a resistor connected between the converter switch and the control input of the converter switch controller.

The current sensing structure 328 may be a current sense resistor with a small resistance, for example 0.2 to 0.5Ω, that may be connected in series with, for example, the converter switch 106 or the freewheeling path. The current through the converter switch 106 or the freewheeling path will also flow through the resistor 328 and produce a small voltage drop which may be measured and evaluated. The converter switch controller 102 may compare the measured current with a target current and produce a corresponding signal at the gate drive terminal GD. For example, if the measured current is lower than the target current, the converter switch controller 102 may provide a signal so that the converter switch 106 is conducting (or closed) for a longer time during a switching period, while if the measured current is higher than the target current, the converter switch controller 102 may provide a signal so that the converter switch 106 is conducting (or closed) for a shorter time during a switching period. In this way, a feedback structure is provided to adjust the load current to the target current.

In various embodiments, a load circuit 324 may be coupled to the load circuit interface 110. The load circuit may be supplied with its load circuit driving voltage via the load circuit interface 110. The load circuit 324 may be connected to the reference potential Vref. The load circuit 322 may comprise at least one light emitting device 324, for example a light emitting diode (LED). In various embodiments, the load circuit 322 may comprise a plurality of light emitting devices 324 connected in series with each other.

In various embodiments, the damping circuit 330 may be coupled between the control input 104 of the converter switch controller 102 and the inductor 112. The damping circuit 330 may be coupled in parallel to the load circuit interface 110. It may include a parallel connection of a capacitor 350 and a resistor 352. For example, the capacitance of the capacitor 350 may be between 50 to 500 nF and the resistance of the resistor 352 may be between 10 to 50 KΩ. The damping circuit 330 may be used to achieve electromagnetic interference (EMI) specifications for the converter circuit arrangement 300. The capacitor 350 may be used to smoothen the voltage Vout provided at the load circuit interface 110 to the load circuit 324. The damping circuit 330 may be optional.

In various embodiments, the configuration interface 332 may be used, for example, for configuration and/or calibration of the converter switch controller 102. The configuration interface 332 may be configured to couple to a communication circuit 338, for example using digital signals. The communication circuit 338 may be a microprocessor or an universal asynchronous receiver/transmitter (UART) interface. Additionally or alternatively, a Resistor 340 may be used to set a desired or target current, for example a target load current, from the second side B, which may be a SELV side. Resistor 334 and capacitor 336 may be configured as a low pass filter for any signals at the communication interface 332. The resistance of resistor 334 may be chosen large enough so that the maximum current flowing through the configuration interface 332 does not exceed allowable SELV currents. For example, resistor 334 may be chosen so that the maximum current is less than 2 mA, for example when two or more of the interfaces 110, 332, 342 are touched by a person.

In various embodiments, the converter circuit arrangement 300 may further include a temperature interface 342 configured to couple to a temperature sensor 344. The temperature sensor 344 may provide a temperature dependant resistance, which may be transformed in a temperature dependant voltage. The temperature dependant voltage may be compared to a threshold and the converter switch controller 102 may adjust, for example lower or turn off, the load current or turning off the load current if the temperature is too high.

The temperature sensor 344 may be coupled via a resistor 346 to terminal TS. The resistance of resistor 346 may be chosen large enough so that the maximum current flowing through the temperature interface 342 does not exceed allowable SELV currents. For example, resistor 346 may be chosen so that the maximum current is less than 2 mA.

FIG. 4 shows an embodiment of a converter circuit arrangement 400. The converter circuit arrangement 400 may be the same as or similar to the embodiment of a converter circuit arrangement 300 shown in FIG. 3, so that the corresponding description may also apply. However, there may be the following differences:

In FIG. 3, a freewheeling device, for example a diode 202 or a synchronized transistor, is coupled between the second power supply potential V2 and the converter switch 106. As a result, the current sensing structure 328 may be configured to provide an input to the control input 104 of the converter switch controller 104 during an on-period as well as during an off-period of the controller switch 106.

In the converter circuit arrangement 400 shown in FIG. 4, the freewheeling device 202 may be coupled between the second power supply potential V2 and the reference potential node 326. As a result, the current sensing structure 328 may be configured to provide an input to the control input 104 of the converter switch controller 104 only during an on-period of the controller switch 106 as the current in the freewheeling path will not flow through the current sensing structure 328. In this case, the freewheeling current will not dissipate power in the current sensing structure 328, thus improving the efficiency of the converter circuit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A converter circuit arrangement, comprising:
a power supply that comprises a first supply voltage node and a second supply voltage node, wherein the power supply is configured to develop a floating voltage between the first supply voltage node and the second supply voltage node;
a converter switch controller comprising a control input and a converter switch coupled between the first supply voltage node and the control input, wherein the converter switch controller is configured to drive the converter switch between an open state and a closed state based on a feedback signal developed at the control input;
a load circuit interface;
an inductor coupled between the second supply voltage node and the load circuit interface, wherein the load circuit interface is coupled between the control input and the inductor in series with a ground reference node; and
a diode or transistor coupled between the inductor and the ground reference node and configured to provide a freewheeling path for current flowing through the inductor and the load circuit interface when the converter switch is in the open state.

2. The converter circuit arrangement of claim 1, wherein the control input is coupled to a controller reference potential node.

3. The converter circuit arrangement of claim 2, wherein the controller reference potential node is configured to be coupled to a controller reference potential.

4. The converter circuit arrangement of claim 3, wherein the controller reference potential is a reference potential for at least one control signal of the controller.

5. The converter circuit arrangement of claim 1, wherein the converter switch comprises a N-channel power transistor switch.

6. The converter circuit arrangement of claim 1, further comprising an auxiliary power supply, wherein the auxiliary power supply is configured to develop a voltage between a first auxiliary supply voltage node and a second auxiliary supply voltage, and wherein the converter switch controller is configured to receive the voltage as a supply voltage.

7. The converter circuit arrangement of claim 6, wherein the first auxiliary supply voltage node is configured to be connected to a ground reference potential.

8. The converter circuit arrangement of claim 1, wherein the converter switch controller comprises a programmable controller.

9. The converter circuit arrangement of claim 1, wherein the diode or transistor has a first terminal that is coupled to the second supply voltage node and a second terminal that is coupled to the ground reference node.

10. The converter circuit arrangement of claim 9, wherein the inductor has a first terminal that is coupled to the second supply voltage node and a second terminal that is coupled to the load circuit interface.

11. The converter circuit arrangement of claim 1, further comprising: a current sensing structure.

12. The converter circuit arrangement of claim 11, wherein the current sensing structure is configured to provide an input to the control input of the converter switch controller only during an on-period of the controller switch.

13. The converter circuit arrangement of claim 11, wherein the current sensing structure comprises a resistor connected between the control input of the converter switch controller and the load circuit interface.

14. The converter circuit arrangement of claim 1, further comprising:
a load circuit coupled to the load circuit interface, wherein the load circuit is configured to be connected to a ground reference potential.

15. The converter circuit arrangement of claim 14, wherein the load circuit comprises at least one light emitting device.

16. The converter circuit arrangement of claim 15, wherein the load circuit comprises a plurality of light emitting devices, wherein the light emitting devices of the plurality of light emitting devices are connected in series with each other.

17. The converter circuit arrangement of claim 1, further comprising:
a damping circuit coupled between the control input of the converter switch controller and the inductor.

18. The converter circuit arrangement of claim 1, further comprising:
at least one of
a configuration interface; and
a temperature interface.

19. The converter circuit arrangement of claim 1, wherein the power supply is configured to develop a first DC voltage on the first supply voltage node and to develop a second DC voltage on the second supply voltage node.

20. A converter circuit arrangement, comprising:
a transistor;
a controller that has a first terminal coupled to a gate terminal of the transistor and a second terminal coupled to a source terminal of the transistor, wherein the controller is configured to drive the transistor between an open state and a closed state based on a feedback signal developed at the second terminal of the controller;
a power supply that is configured to develop a floating voltage between a first supply voltage node and a second supply voltage node, wherein a drain terminal of the transistor is coupled to the first supply voltage node; and
an inductor, a freewheeling device and a load circuit interface arranged in a topology wherein each one of a first terminal of the inductor and a first terminal of the freewheeling device is coupled to the second primary supply voltage node and the inductor and load circuit interface are series-connected to a ground reference node in parallel with the freewheeling device, and wherein the freewheeling device is non-conducting when the transistor is in the closed state and conducting when the transistor is in the open state to provide a freewheeling path for current flowing through the inductor and the load circuit interface.

\* \* \* \* \*